United States Patent
Kato et al.

(10) Patent No.: US 12,321,047 B2
(45) Date of Patent: Jun. 3, 2025

(54) OPTICAL MODULATOR AND OPTICAL TRANSMISSION DEVICE USING SAME

(71) Applicant: SUMITOMO OSAKA CEMENT CO., LTD., Tokyo (JP)

(72) Inventors: Kei Kato, Tokyo (JP); Hideki Ichimei, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 169 days.

(21) Appl. No.: 18/029,242

(22) PCT Filed: Jan. 14, 2022

(86) PCT No.: PCT/JP2022/001142
§ 371 (c)(1),
(2) Date: Mar. 29, 2023

(87) PCT Pub. No.: WO2022/163393
PCT Pub. Date: Aug. 4, 2022

(65) Prior Publication Data
US 2023/0367143 A1    Nov. 16, 2023

(30) Foreign Application Priority Data
Jan. 29, 2021    (JP) .................................. 2021-013607

(51) Int. Cl.
*G02F 1/01*    (2006.01)
(52) U.S. Cl.
CPC .......... *G02F 1/011* (2013.01); *G02F 2201/50* (2013.01)

(58) Field of Classification Search
CPC ...................................................... G02F 1/011
See application file for complete search history.

(56) References Cited

U.S. PATENT DOCUMENTS

| 5,719,979 A | 2/1998 | Furuyama |
| 2004/0131318 A1 | 7/2004 | Mori |

(Continued)

FOREIGN PATENT DOCUMENTS

| CN | 111146154 A | 5/2020 |
| JP | H07-1995-63959 A | 3/1995 |

(Continued)

*Primary Examiner* — Tina Wong
(74) *Attorney, Agent, or Firm* — IpHorgan Ltd.

(57) ABSTRACT

An optical modulator that suppresses poor welding between a case main body and a lid portion is provided. There is provided an optical modulator including: a case that is a rectangular parallelepiped and accommodates at least an optical waveguide element, in which the case includes a case main body 1 in which one surface of the rectangular parallelepiped forms an opening portion, and a lid portion 2 that has a rectangular shape and that closes the opening portion, the lid portion includes a peripheral part that has a thin thickness, and a protruding part 20 that is formed on the lid portion excluding the peripheral part and that protrudes toward an inside of the case, and when the lid portion is fitted into the case main body, a distance between an inner peripheral side of an end surface forming the opening portion of the case main body and an outer edge of the protruding part is set such that a distance d1 formed on a short-side side of the lid portion is larger than a distance d2 formed on a long-side side of the lid portion.

8 Claims, 9 Drawing Sheets

(56) References Cited

U.S. PATENT DOCUMENTS

2006/0028711 A1* 2/2006 Sakane .................. G02F 1/011
                                                          359/321
2021/0006230 A1* 1/2021 Kawai ................ H03H 9/02448

FOREIGN PATENT DOCUMENTS

| JP | H07-1995-198997 A | 8/1995 |
| JP | 2005-050861 A | 2/2005 |
| JP | 2008-311193 A | 12/2008 |
| JP | 2010-239071 A | 10/2010 |
| JP | 2011-181215 A | 9/2011 |
| WO | 2008155616 A1 | 12/2008 |

* cited by examiner

OPTICAL MODULATOR AND OPTICAL TRANSMISSION DEVICE USING SAME

CROSS REFERENCE TO RELATED APPLICATIONS

This application is a national stage completion application of PCT Application No. PCT/JP2022/001142, filed Jan. 14, 2022, and claims priority from Japanese Patent Application No. 2021-013607 filed Jan. 29, 2021. Each of these applications is incorporated by reference herein in its entirety.

TECHNICAL FIELD

The present invention relates to an optical modulator and an optical transmission device using the same, and more particularly, to an optical modulator including a case that is a rectangular parallelepiped and that accommodates at least an optical waveguide element, in which the case includes a case main body in which one surface of the rectangular parallelepiped forms an opening portion and a lid portion that has a rectangular shape and that closes the opening portion.

BACKGROUND ART

In the field of optical communication or the field of optical measurement, an optical modulator using an optical waveguide element including an optical waveguide and a modulation electrode that modulates a light wave propagating through the optical waveguide is frequently used. As disclosed in Patent Literature No. 1, a typical optical modulator includes an optical waveguide element (a chip on which an optical waveguide, a modulation electrode, and the like are formed), an optical component, an electronic component, and the like mounted inside a metal case and is airtightly sealed by a metal lid portion.

A rectangular parallelepiped shape is often employed for the case, and the side wall of the case includes, for example, an optical fiber introduction portion or an optical window portion that is used to input/output light and that is provided on the short-side side, and a high frequency connector or a pin that is used to input/output an electrical signal and that is disposed on the long-side side.

The metal lid portion is disposed on the opening portion formed in the upper (or lower) portion of the metal case, and the metal case and a part of the lid portion are welded over the entire periphery by seam welding (resistance welding) and are airtightly sealed. The part to be welded is subjected to surface treatment including metal plating, such as Au or Ni. In addition, in order to relieve the (thermal) stress caused by seam welding, seam welding may be performed by disposing a brazing material with a low melting point or the like between the case and the lid portion.

FIGS. 1A to 1C are diagrams showing an example of a case, in which FIG. 1A is a plan view of the case, FIG. 1B shows a cross-sectional view taken along an alternate long and short dash line A-A' of FIG. 1A, and FIG. 1C shows a cross-sectional view taken along an alternate long and short dash line B-B' of FIG. 1A. A lid portion 2 is disposed so as to close the opening portion of a case main body 1.

The lid portion 2 has a protruding part 20 protruding inward of the case main body 1, the thickness of the lid portion 2 coming into contact with an end surface 10 that forms the opening portion of the case main body is thin, and the thickness of the protruding part 20 located at the opening portion is thick. By fitting (dropping) the protruding part 20 of the lid portion into the opening portion of the case 1, it becomes easier to adjust the positions of the case main body 1 and the lid portion 2 before seam welding, and it is possible to prevent the positional deviation of the lid portion due to the contact with a roller electrode during seam welding.

The distance (a gap d1 on the short-side side and a gap d2 on the long-side side) between an inner wall (an inner peripheral side 10L of the end surface 10 forming the opening portion) of the opening portion of the case main body 1 and an outer edge 20L of the protruding part 20 of the lid portion is made smaller, so that the accuracy of position adjustment can be improved, and the effect of preventing positional deviation can be enhanced. Conventionally, this gap has been generally made constant (d1=d2) over the entire periphery of the opening portion of the case main body.

In addition, in the lid portion used for optical devices such as optical modulators as in the conventional art, the protruding part 20 of the lid portion 2 is formed by etching a metal plate (SUS304, Kovar, or the like) having a plate thickness of about 0.3 to 0.5 mm in consideration of productivity or cost to thin the outer peripheral portion of the metal plate to about 0.1 mm.

Since the protruding part is formed by etching, an inclined portion (side edge portion) R as shown in FIG. 2 is generated at the boundary between the thick part and the thin part of the lid portion. Since the size of the inclined portion increases as the thickness to be etched increases, in a case where the inclined portion is to be reduced, the original plate thickness is set thin and the thickness to be etched is made thin.

As described above, in order to adjust the positions of the case main body 1 and the lid portion 2, a case where the gaps (d1, d2) between the inner wall (inner peripheral side 10L) of the opening portion of the case and the outer edge 20L of the protruding part of the lid portion are made constant (d1=d2) over the entire periphery of the opening portion of the case main body, and the gaps (d1, d2) are made small has been described. Specifically, the gap (d1, d2) between the inner wall (inner peripheral side 10L) of the opening portion of the case and the outer edge 20L of the protruding part of the lid portion is set to a size of 0.2 to 0.5 mm.

Seam welding is a technique of applying pressure to the outer peripheral portion of the lid portion 2 with two roller electrodes running in parallel and of continuously welding the contact portions between the roller electrodes and the lid portion while energizing between the roller electrodes, and is used for airtight sealing of products that require high airtightness, such as optical devices. FIG. 3A shows a state of the vicinity of one roller electrode RE. With the energization between the roller electrodes, the contact portion between the roller electrode RE and the lid portion 2 generates heat (heat is generated because the contact resistance is large), and the temperature rises to dissolve the metal (including metal plating, such as surface-treated Au or Ni) in the contact portion and the vicinity of the contact portion, so that the lid portion 2 and the case main body 1 are welded. The roller electrode to be actually used is larger than the shown roller electrode as compared with the size of the case and the like.

Since the contact portion between the roller electrode and the lid portion 2 generates heat when seam welding is performed, the temperature of the entire lid portion rises (depending on the welding conditions such as the current value and the size of the lid portion or the case main body, but is, for example, about 100° C. to 200° C.). Although the case main body is also warmed by heat transfer from the welded portion or the contact portion between the roller electrode and the lid portion 2, a temperature difference occurs between the lid portion and the metal case.

Before seam welding, as shown in FIG. 3A, there is no gap between the end surface 10 of the opening portion of the case 1 and the lid portion 2, and pressure is applied to the lid portion by the roller electrode RE. In a case where seam welding is performed in this state, the space between the case main body and the lid portion is properly welded and airtightly sealed.

However, when seam welding is started, the temperature of the entire lid portion gradually rises, and the size of the lid portion increases because of thermal expansion. As a result, as shown in FIG. 3B, the inclined portion R of the lid portion gets on the side wall of the case 1, and a gap is generated between the end surface 10 of the opening portion of the case 1 and the lid portion 2. An arrow EX of FIG. 3B indicates the direction of thermal expansion.

In a case where a gap is generated between the end surface 10 of the opening portion of the case main body and the lid portion 2, as shown in FIG. 4, a part of the lid portion 2 is deformed with a contact point FU between the case main body 1 and the inclined portion R of the lid portion 2 as a fulcrum because of the pressure F applied by the roller electrode RE. The deformation of the lid portion 2 increases the contact area of a contact portion C between the roller electrode RE and the lid portion 2. Since an increase in the contact area reduces the contact (electrical) resistance between the roller electrode RE and the lid portion 2 and the energization (amount of current) between the roller electrodes is constant, the amount of heat generated at the contact portion C between the roller electrode RE and the lid portion 2 is reduced. As a result, the temperature of the contact portion C and the vicinity of the contact portion C does not reach the melting point of the metal (including metal plating, such as surface-treated Au or Ni), so that insufficient welding (defect) occurs.

In addition, since the gap between the end surface 10 of the opening portion of the case main body and the lid portion 2 is large even if the metal in the contact portion C and the vicinity of the contact portion C is dissolved, the space between the case main body and the lid portion is not completely welded, so that insufficient airtight sealing occurs.

As shown in FIG. 4, in the deformation of the lid portion 2 due to the inclined portion R of the lid portion 2 getting on the sidewall of the case main body 1, the degree of deformation of the lid portion 2 increases (bending increases) in a case where the width W1 of the end surface 10 of the opening portion of the case main body in which the case main body and the lid portion come into contact with each other is narrow (specifically, 1.5 mm or lower) and the length L from the above-described fulcrum FU to the tip portion of the lid portion 2 is short. Further, in a case where the gap between the end surface 10 of the opening portion of the case main body and the lid portion 2 is the same, the shorter the length L is, the greater the degree of deformation is. Since the contact area of the contact portion C between the roller electrode RE and the lid portion 2 increases in a case where the degree of deformation increases, poor welding (defect) is likely to occur.

In an optical device such as an optical modulator using a case of a rectangular parallelepiped, seam welding is performed in accordance with the procedure shown in FIGS. 5A to 5C in order to reduce the distortion of the case main body 1 and the lid portion 2 due to seamwelding. It is desirable to first spot-weld the center S of the long side of the case, then weld from the center of the long side toward both ends of the long side, and finally weld the short side. This is because, in a case where the short side is welded first, the extension of the lid portion due to thermal expansion in the long-side direction (X direction) is hindered and greater (thermal) stress is generated. In FIG. 5A, the circled numbers indicate the sequence and the direction of welding. FIG. 5B is a cross-sectional view showing a state of seam welding seen from the short-side side (X direction) of the case, and FIG. 5C is a cross-sectional view seen from the long-side side (Y direction). In FIG. 5A, although the seam welding of the long side of the case is performed in two stages, the seam welding may be performed in more stages in a case where the length of the long side is large.

In the welding procedure as shown in FIGS. 5A to 5C, the lid portion 2 extends because of thermal expansion while the long sides are seam-welded, and the short sides on both sides of the case main body 1 are in states shown in FIGS. 3B and 4, so that insufficient welding (defect) is likely to occur on the short sides of both sides of the case. Although it depends on the seam welding conditions, the longer the long sides of the case are, the longer the welding time is (the longer the heat generation time is) and the larger the amount of extension of the lid portion due to thermal expansion is, so that insufficient welding (defect) tends to easily occur on the short sides. During the seam welding of the long sides, the short-side direction (Y direction) of the lid portion is also affected by thermal expansion, but the amount of extension in the short-side direction (Y direction) of the lid portion is smaller than the amount of extension in the long-side direction (X direction) because the length of the short side of the lid portion is shorter than the length of the long side. Moreover, since the welding of the long sides between the lid portion 2 and the case main body 1 is completed before the amount of extension in the short-side direction becomes large, insufficient welding (defect) on the long sides (arrows 1 and 2 in FIG. 5A) does not occur.

CITATION LIST

Patent Literature

[Patent Literature No. 1] Japanese Laid-open Patent Publication No. H07-198997

SUMMARY OF INVENTION

Technical Problem

An object to be achieved by the present invention is to solve the above-described problems and to provide an optical modulator that suppresses poor welding between the case main body and the lid portion and an optical transmission device using the same.

Solution to Problem

In order to achieve the above object, the optical modulator and the optical transmission device of the present invention have the following technical features.

(1) There is provided an optical modulator including: a case that is a rectangular parallelepiped and accommodates at least an optical waveguide element, in which the case includes a case main body in which one surface of the rectangular parallelepiped forms an opening portion, and a lid portion that has a rectangular shape and that closes the opening portion, the lid portion includes a peripheral part that has a thin thickness, and a protruding part that is formed on the lid portion excluding the peripheral part and that protrudes toward an inside of the case, and when the lid portion is fitted into the case main body, a distance between an inner peripheral side of an end surface forming the opening portion of the case main body and an outer edge of the protruding part is set such that a distance formed on a short-side side of the lid portion is larger than a distance formed on a long-side side of the lid portion.

(2) In the optical modulator according to (1), a side surface of the protruding part of the lid portion includes an inclined portion toward the peripheral part.

(3) In the optical modulator according to (1) or (2), the peripheral part of the lid portion has a thickness of lower than 0.2 mm.

(4) In the optical modulator according to any one of (1) to (3), the protruding part of the lid portion has a thickness of 0.2 mm or higher and 1 mm or lower.

(5) In the optical modulator according to any one of (1) to (4), the opening portion of the case main body is formed by a side wall itself of the case surrounding the opening portion or a sealing member different from the side wall.

(6) In the optical modulator according to any one of (1) to (5), the case main body and the lid portion are sealed by seam welding.

(7) In the optical modulator according to any one of (1) to (6), a driver circuit element that generates an electrical signal to be applied to a modulation electrode provided in the optical waveguide element is disposed adjacent to the optical waveguide element.

(8) There is provided an optical transmission device including: the optical modulator according to any one of (1) to (7); and a signal generator that generates a modulation signal to be input to the driver circuit element.

Advantageous Effects of Invention

The present invention provides an optical modulator including: a case that is a rectangular parallelepiped and that accommodates at least an optical waveguide element, in which the case includes a case main body in which one surface of the rectangular parallelepiped forms an opening portion, and a lid portion that has a rectangular shape and that closes the opening portion, the lid portion includes a peripheral part that has a thin thickness, and a protruding part that is formed on the lid portion excluding the peripheral part and that protrudes toward an inside of the case, and when the lid portion is fitted into the case main body, a distance between an inner peripheral side of an end surface forming the opening portion of the case main body and an outer edge of the protruding part is set such that a distance formed on a short-side side of the lid portion is larger than a distance formed on a long-side side of the lid portion. Therefore, it is possible to suppress the occurrence of poor welding without forming a gap between the lid portion and the end surface forming the opening portion of the case main body even in a case where the amount of extension in the long-side direction is increased by thermal expansion during welding between the case main body and the lid portion.

BRIEF DESCRIPTION OF DRAWINGS

FIGS. 1A to 1C are diagrams illustrating a case of a rectangular parallelepiped, in which FIG. 1A is a plan view, FIG. 1B is a cross-sectional view taken along an alternate long and short dash line A-A' of FIG. 1A, and FIG. 1C is a cross-sectional view taken along an alternate long and short dash line B-B' of FIG. 1A.

FIGS. 3A and 3B are diagrams showing a state of a welded part during seam welding, in which FIG. 3A shows a state in a case where the amount of extension due to thermal expansion is small, and FIG. 3B shows a state in a case where the amount of extension due to thermal expansion is large.

FIGS. 5A to 5C are diagrams showing a procedure when the case of the rectangular parallelepiped is seam-welded, in which FIG. 5A is a plan view, FIG. 5B is a cross-sectional view seen from a short-side side, and FIG. 5C is a cross-sectional view seen from a long-side side.

FIGS. 6A to 6C are diagrams showing an example of a case in which an opening portion of a case main body is formed by a sealing member SL, in which FIG. 6A is a plan view, FIG. 6B is a cross-sectional view taken along an alternate long and short dash line A-A' of FIG. 6A, and FIG. 6C is a cross-sectional view taken along an alternate long and short dash line B-B' of FIG. 6A.

DESCRIPTION OF EMBODIMENTS

Hereinafter, the present invention will be described in detail using preferred examples.

Figure 1A:
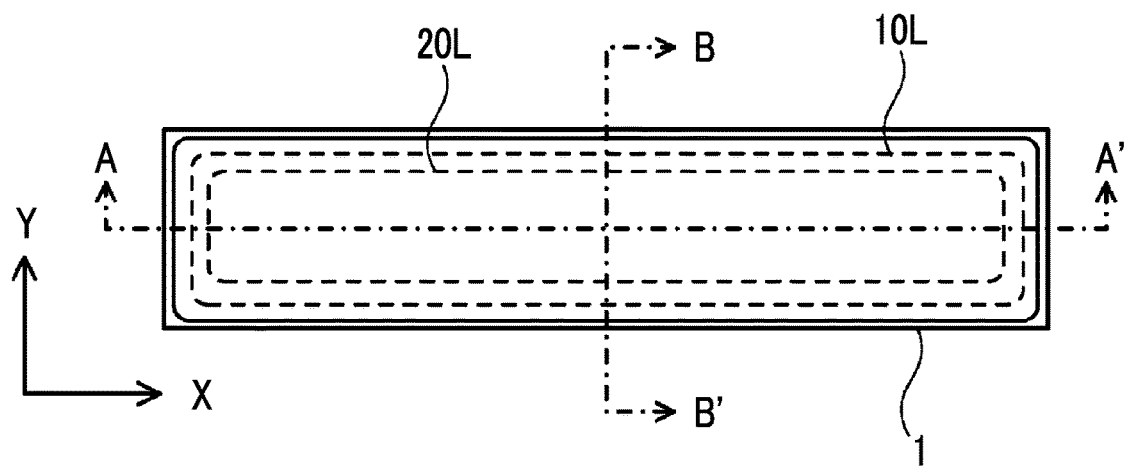
Figure 1B:
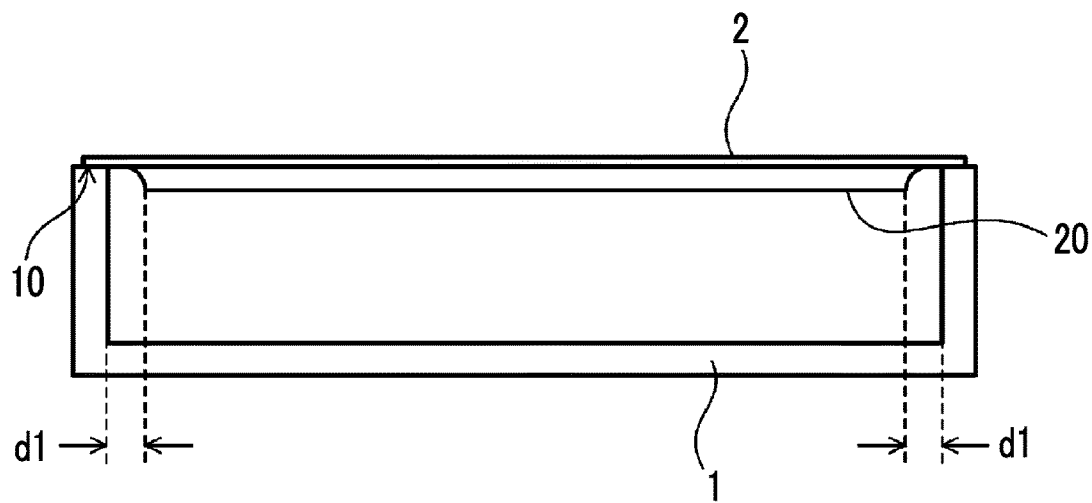
Figure 1C:
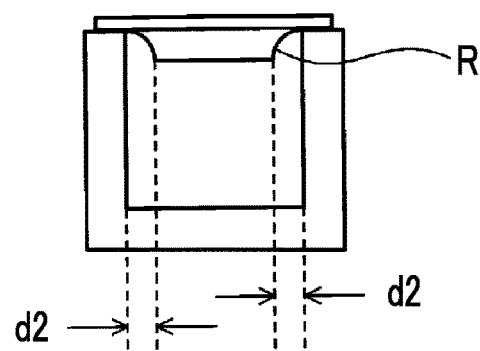

As shown in FIGS. 1A to 1C, the present invention provides an optical modulator including: a case that is a rectangular parallelepiped and that accommodates at least an optical waveguide element, in which the case includes a case main body 1 in which one surface of the rectangular parallelepiped forms an opening portion, and a lid portion 2 that has a rectangular shape and that closes the opening portion, the lid portion includes a peripheral part that has a thin thickness, and a protruding part 20 that is formed on the lid portion excluding the peripheral part and that protrudes toward an inside of the case, and when the lid portion is fitted into the case main body, a distance between an inner peripheral side of an end surface 10 (in a case of FIG. 1B, the uppermost surface of the side wall of the case main body 1) forming the opening portion of the case main body and an outer edge of the protruding part is set such that a distance $d_1$ formed on a short-side side of the lid portion is larger than a distance $d_2$ formed on a long-side side of the lid portion.

As described above, when the case of the rectangular parallelepiped is airtightly sealed by welding, the lid portion extends because of the influence of thermal expansion due to welding on the long-side side, and the lid portion gets on the side wall of the case main body, so that insufficient welding (defect) is likely to occur during welding on the short-side side of the case. Therefore, in the present invention, for the short-side sides on both sides of the case, the gap $d_1$ between the inner wall of the opening portion of the case main body and the protruding part of the lid portion is configured to be larger than the gap d2 on the long-side side (d1>d2).

Metal, such as SUS304 and Kovar, is used as a material constituting the case, and it is possible not only to integrally form the case main body by cutting a single metal material but also to form a single case by combining a plurality of members produced by cutting, pressing, or the like. The form to be selected is determined in consideration of the case size or function, productivity or cost, or the like. The case main body and the lid portion may be made of the same material or can also be made of different materials. The surfaces of the case and the lid portion, which are to be the welded part between the case main body and the lid portion, may be surface-treated with metal plating, such as Au or Ni. Further, as the case used in the present invention, a case in which a ceramic material is used for a part of the case main body can also be used, as in a compact integrated optical device such as a High Bandwidth Coherent Driver Modulator (HB-CDM) obtained by combining an optical waveguide element and a driver circuit element that drives the optical waveguide element, which will be described below.

Figure 2:
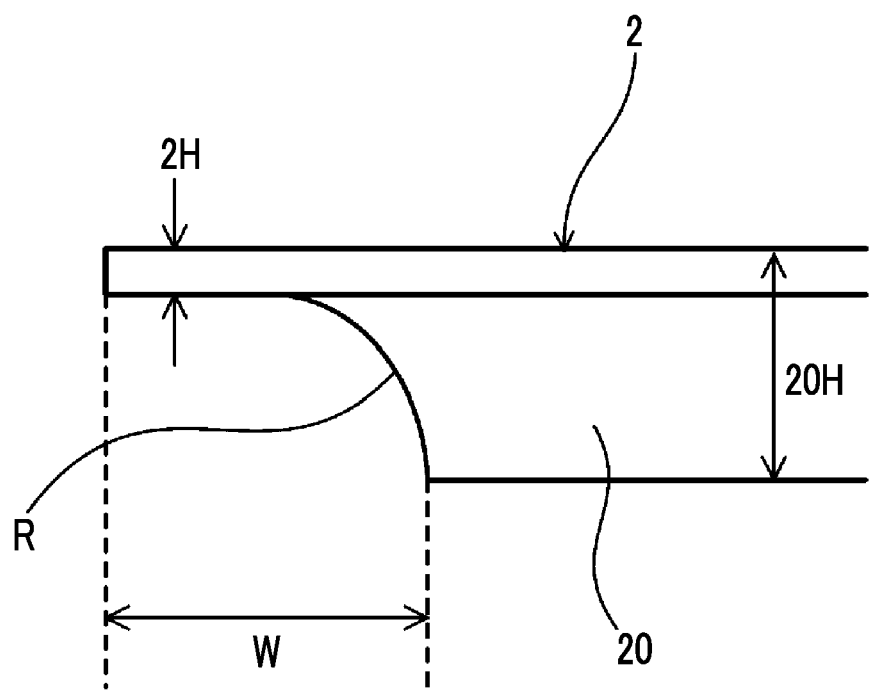
FIG. 2 is a diagram showing the shape of a vicinity of an edge of a lid portion.
Figure 3A:
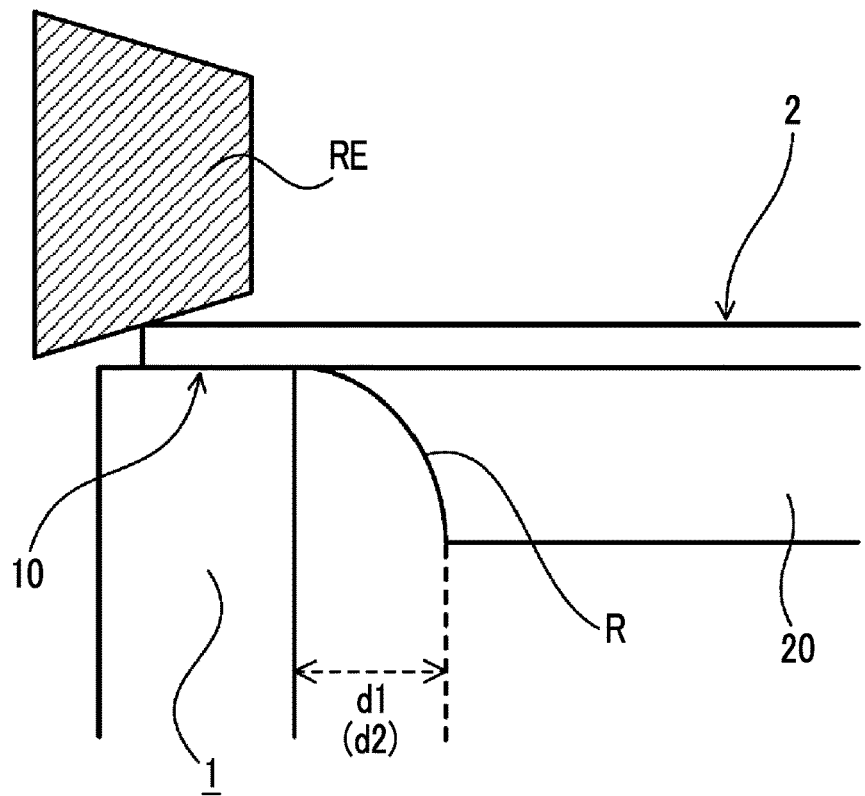
Figure 3B:
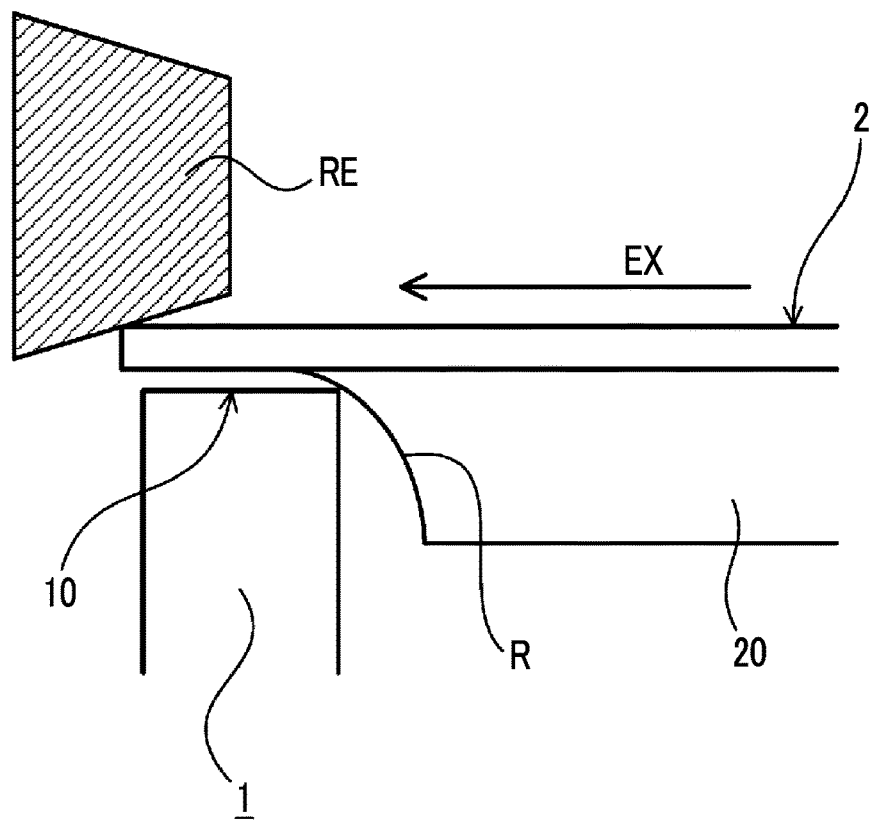

A metal material (SUS304, Kovar, or the like) is used for the lid portion, and the protruding part 20 shown in FIGS. 1A to 1C and the like is provided. As a method for forming the protruding part (thinly forming the peripheral part, etc of the lid portion), although cutting, electron beam processing or the like is also possible, etching can be used to make the peripheral part of the lid portion thin in order to stably form the lid portion at a low cost. When etching is used, as shown in FIG. 2, a side surface R of the protruding part 20 of the lid portion 2 becomes a surface inclined toward the peripheral part of the lid portion. This inclined surface is called an "inclined portion". As described above, the inclined portion of the lid portion is also a cause of getting on the side wall of the case main body.

Meanwhile, in order to seam-weld the lid portion to the case main body, it is necessary that the thickness of the peripheral part of the lid portion is set to 0.05 mm or higher and lower than 0.2 mm. The thickness of the lid portion (thickness 20H of the thick part of the protruding part 20) is set in the range of 0.2 to 1 mm in consideration of the rigidity that varies depending on the size of the lid portion, the time required for etching, and the like. More preferably, the thickness is set to 0.3 to 0.5 mm.

As specific dimensions of the gaps d1 and d2, for example, in a case of the lid portion made of SUS304 and having a length of 100 mm×a width of 15 mm, d1 is set to about 0.6 to 1 mm, and d2 is set to 0.3 to 0.5 mm in consideration of the amount of extension of the lid portion due to thermal expansion, which can be calculated from the amount of temperature fluctuation of the lid portion due to seam welding, or the dimensional tolerance or mounting accuracy of each component (the case main body and the lid portion). By setting the gap d1 large in this manner, it is possible to prevent the inclined portion of the lid portion from getting on the side wall of the case main body and to prevent insufficient welding (defect). Further, by setting the gap d2 narrow as in the conventional case, it is possible to maintain the accuracy of the position adjustment before seam welding and to maintain the effect of preventing the positional deviation of the lid portion during seam welding.

Figure 6A:
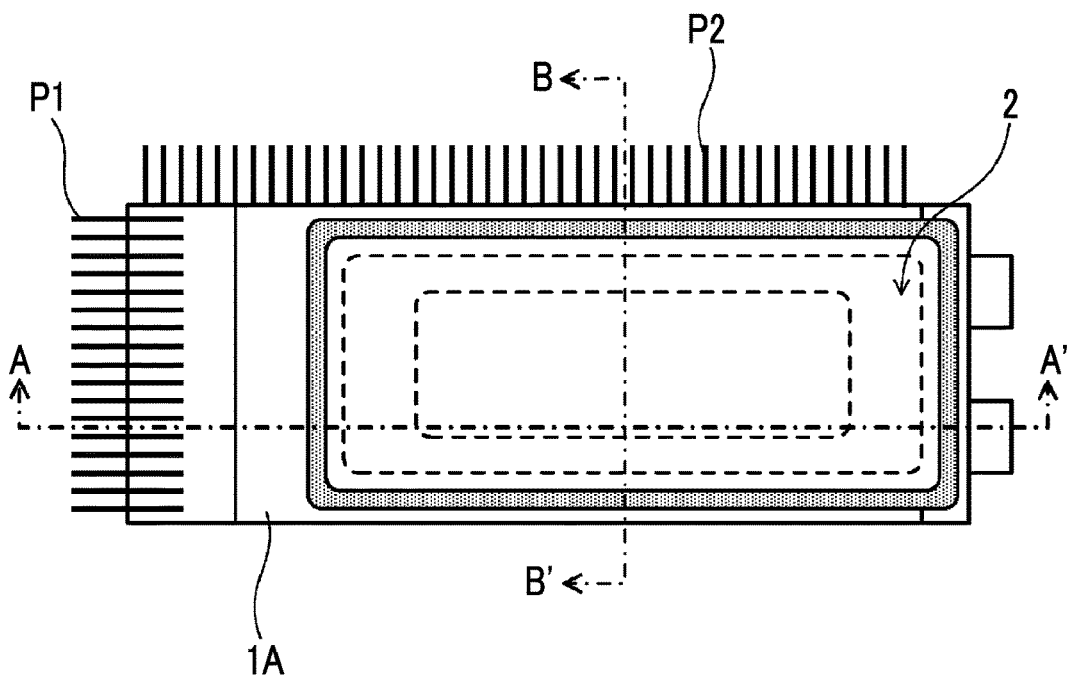
Figure 6B:
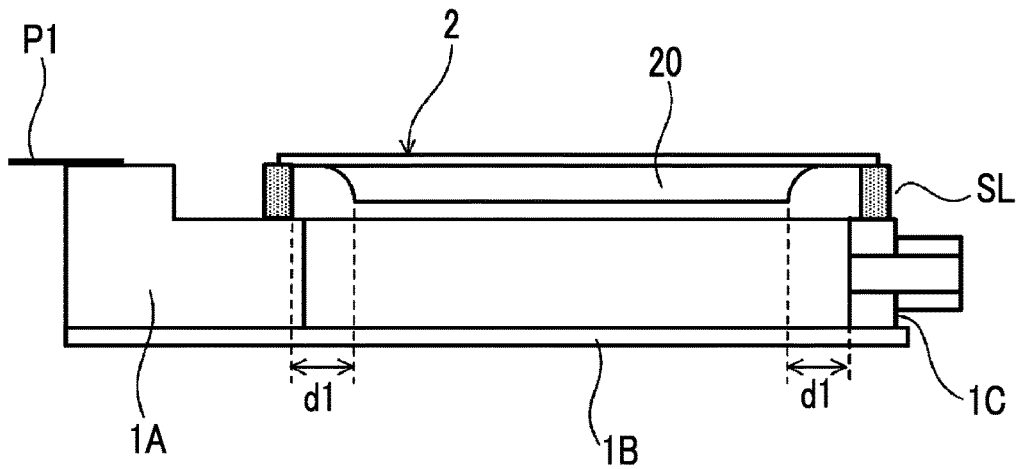
Figure 6C:
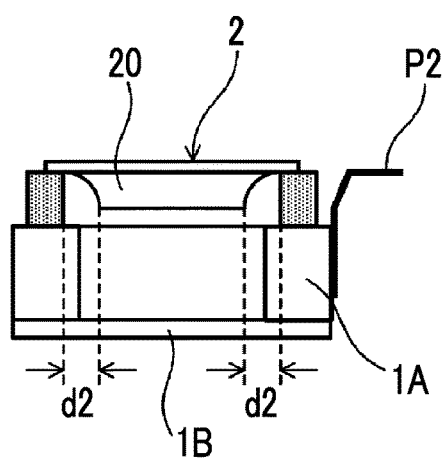

The optical modulator of the present invention can also be applied to a case where the opening portion of the case main body is formed by the sealing member SL surrounding the opening portion, as shown in FIGS. 6A to 6C. In FIGS. 6A to 6C, the case main body is formed by combining a plurality of members, such as a bottom surface (in FIGS. 6B and 6C, although the part disposed on the lower side is illustrated, when the case is disposed on a printed circuit board (PCB) or the like, the bottom surface may be disposed so as to face the printed circuit board side, or an other surface, for example, the upper part in FIGS. 6B and 6C, may also be disposed so as to face the printed circuit board side) 1B of the case, and components (1A, 1C) constituting the side surface part. The members (1A, 1B, and 1C) are joined to each other with metal such as AuSn. The material of each member may be the same or may be different. For example, the member 1A is ceramic, and the member 1B and the member 1C are metal (Kovar, CuW, or the like).

Since seam welding cannot be performed directly on the ceramic of the member 1A, in a case of the case containing such ceramic, the sealing member (seal ring) SL for seam welding is disposed on the end surface on the opening portion side of the case. The surface of the sealing member (seal ring) is subjected to metal plating (Au, Ni, or the like) for seam-welding the sealing member and the lid portion by joining the sealing member and the ceramic. The sealing member (seal ring) is joined to the ceramic or other members with metal, and the opening portion newly formed by the sealing member (seal ring) is airtightly sealed by being closed with the lid portion 2 made of metal or the like and seam-welded. The material of the sealing member (seal ring) SL is generally the same material as that of the lid portion 2, but may be different depending on the purpose. Alternatively, seam welding may be performed by disposing a brazing material with a low melting point or the like between the sealing member (seal ring) SL and the lid portion 2.

Figure 4:
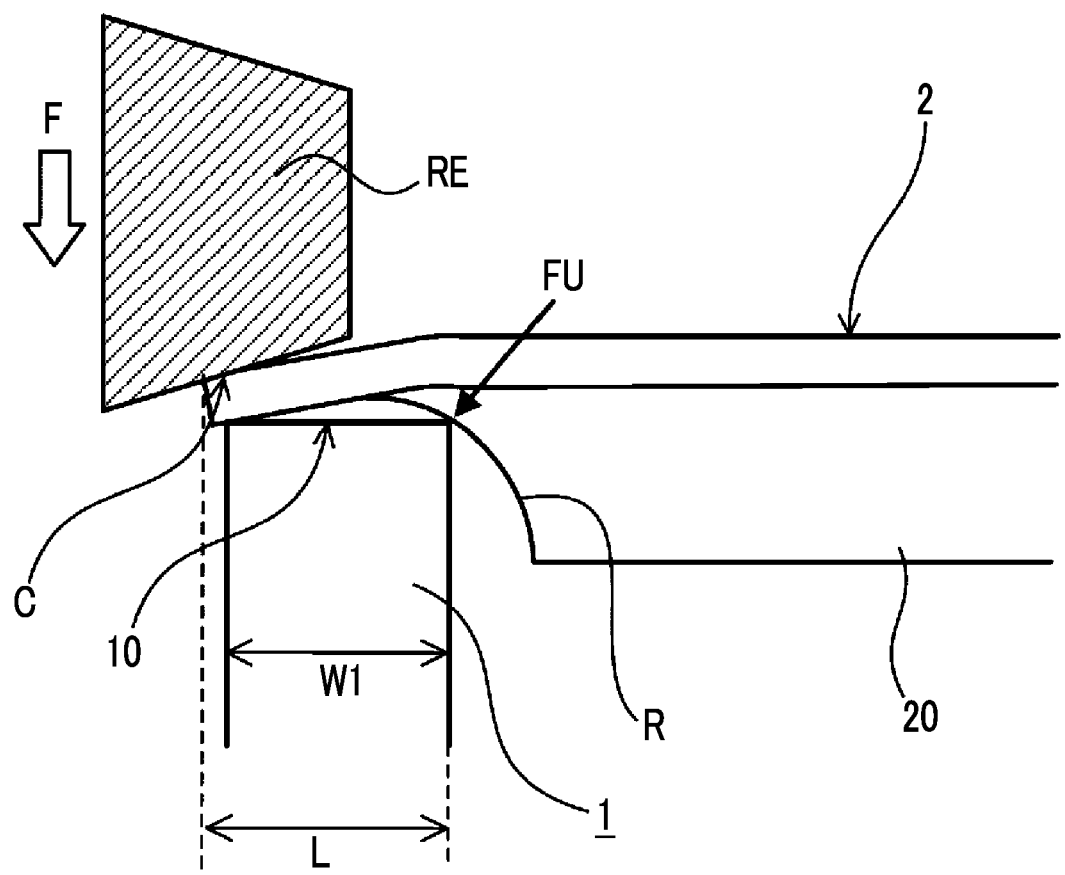
FIG. 4 is a diagram showing a state in which the edge of the lid portion is deformed during seam welding.
Figure 5A:
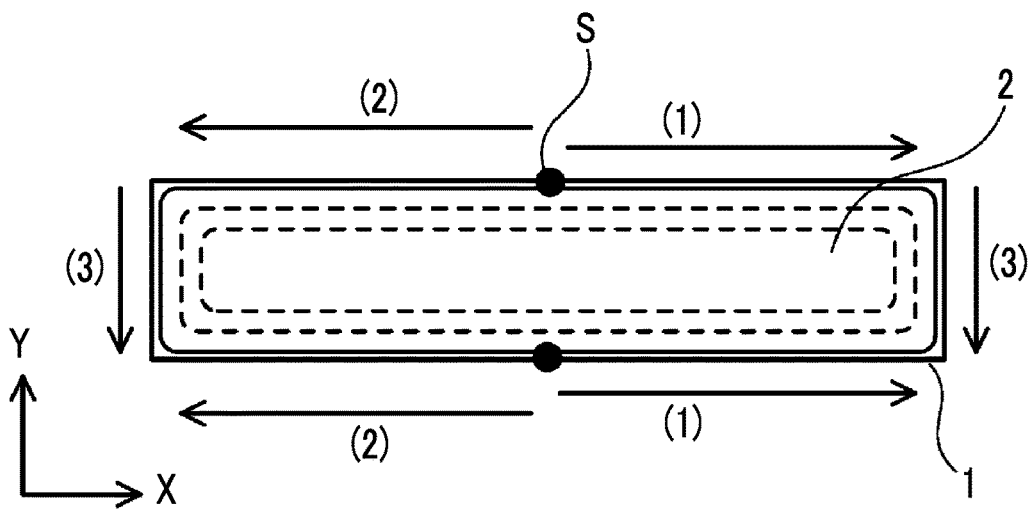
Figure 5B:
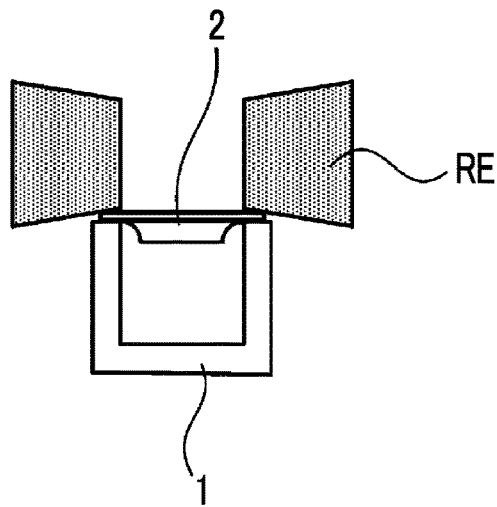
Figure 5C:
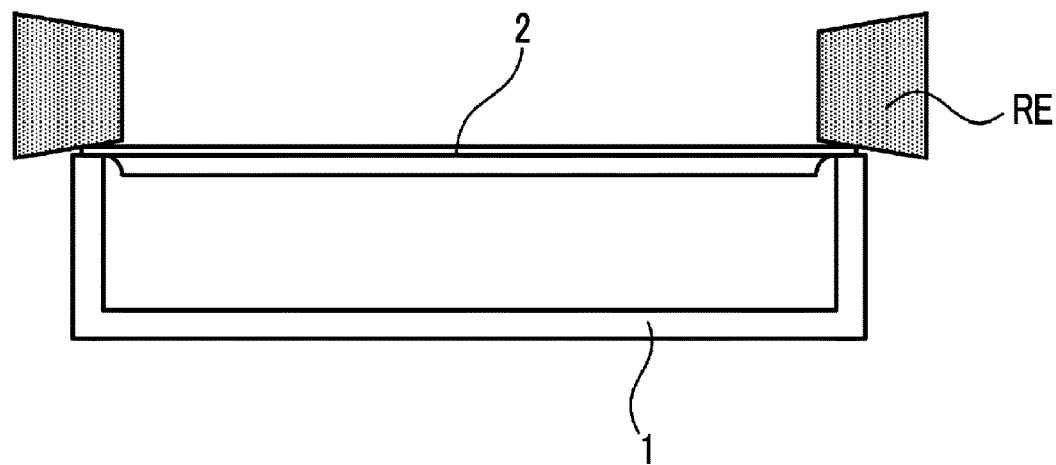

In the optical device such as an HB-CDM using a ceramic case as shown in FIGS. 6A to 6C, since the sizes of the case and the lid portion itself are smaller than those of the conventional optical device, the amount of extension of the lid portion due to thermal expansion is small, so that the risk of insufficient welding (defect) due to the getting-on of the inclined portion of the lid portion is reduced. However, in a case where the sealing member SL is used, the width (corresponding to the width W1 in FIG. 4 of the metal case) of the uppermost portion of the opening portion of the sealing member SL is as narrow as about 0.5 to 1.0 mm, and the length L from the fulcrum FU of the lid portion to the tip portion of the lid portion 2 is likely to be shortened. In addition, the width (symbol W of FIG. 2) of the thin part itself of the peripheral part of the lid portion tends to be also narrowed in conformity with the width of the uppermost portion of the opening portion of the sealing member. Therefore, in a case where the sealing member SL is used, deformation of the peripheral part of the lid portion is more likely to occur than in a case of the metal case (FIGS. 1A to 1C and the like). In order to suppress this, as in the optical modulator of the present invention, the distance (the gap, d1 and d2) between the inner wall of the opening portion of the sealing member and the protrusion-shaped portion of the lid portion may be set such that the gap d1 on the short-side side is larger than the gap d2 on the long-side side.

Figure 7:
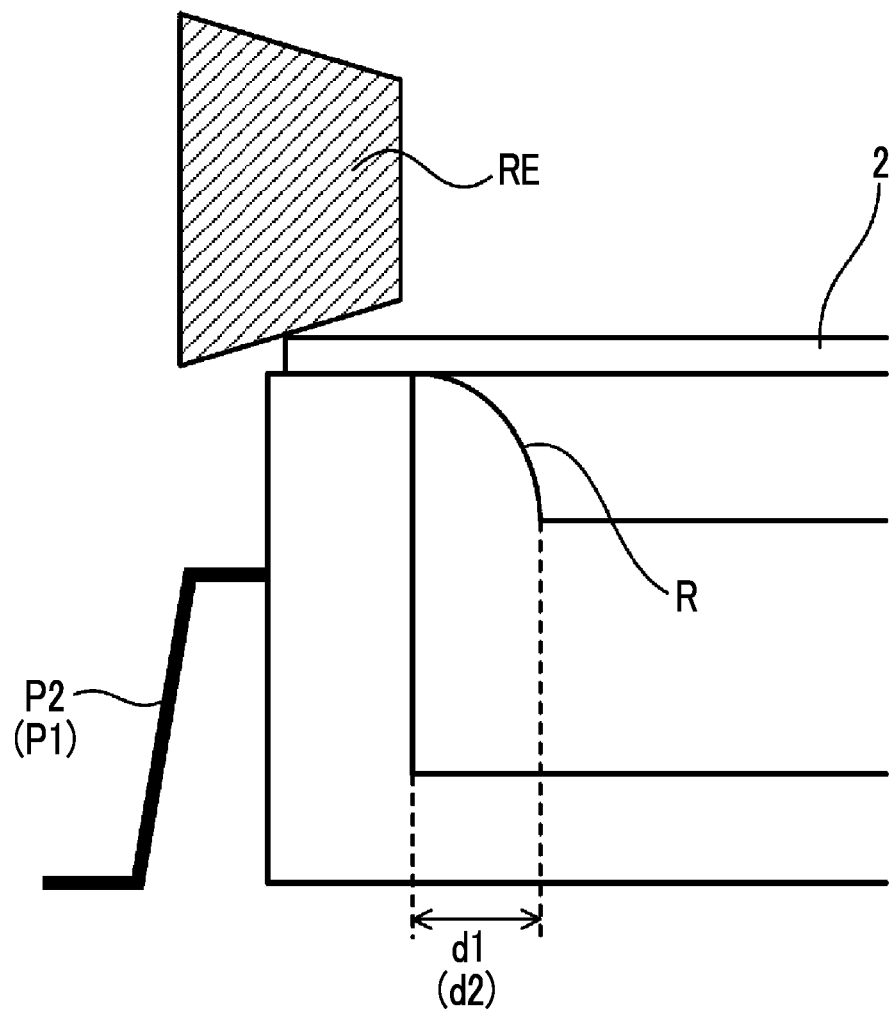
FIG. 7 is a diagram showing the positional relationship between a roller electrode and a lead pin extending to a bottom surface side of the case main body during seam welding in an optical modulator including the lead pin.

For optical devices such as an HB-CDM, an integrated optical device (optical modulator) has been proposed in which an optical waveguide element and a driver circuit element that drives the optical waveguide element are combined. In such an integrated optical device, a case made of a combination of ceramic and metal as shown in FIGS. 6A to 6C is used. FIG. 7 shows the configuration of an electrical connection terminal (lead pin P1 or P2) that is often used in the conventional optical modulator. Since the case is mounted on the printed circuit board and the electrical connection terminal and the printed circuit board are connected by soldering, the solder connection portion of the electrical connection terminal is located on the bottom surface side (lower side in FIG. 7) of the case. In a case shown in FIG. 7, no interference has occurred between the roller electrode RE and the lead pin, and seam welding has not posed a particular problem.

On the other hand, in a case of the integrated optical device, it is necessary to radiate heat generated by the driver circuit element mounted in the case to a heat sink or the like disposed outside the case. There is a case where a part of the case is made of ceramic with low thermal conductivity, or a case where it is inefficient to radiate heat from the lid portion side because the driver circuit and the lid portion are not in contact with each other (there is an air layer between the two). For this reason, there is a structure in which the bottom surface side (lower side in FIG. 8) of the case is used as the heat radiation surface for the driver circuit element and the lid portion side is used as the mounting surface for the printed circuit board. In such a case, as shown in FIG. 8, the solder connection portion of the electrical connection terminal (lead pin P1 or P2) is located on the lid portion side.

Figure 8:
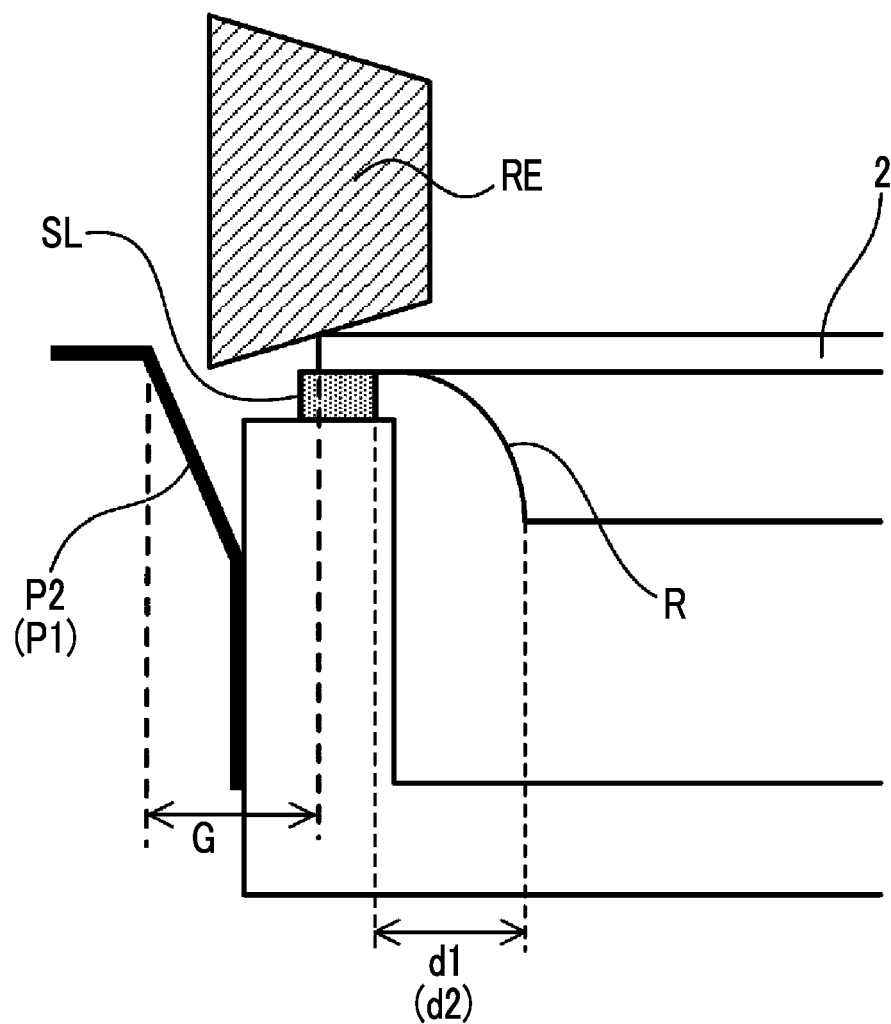
FIG. 8 is a diagram showing the positional relationship between the roller electrode and a lead pin extending to a lid portion side of the case during seam welding in an optical modulator including the lead pin.

In a case of the structure shown in FIG. 8, the outer peripheral portion of the lid portion and (a part of) the electrical connection terminal are close to each other, and for example, the gap G between the two (the distance from the edge of the lid portion to the electrical connection terminal) may be 2 mm or lower. Therefore, the roller electrode RE may come into contact with the electrical connection terminal (P1 or P2) during seam welding and damage the electrical connection terminal. In particular, because of the positional deviation of the lid portion 2, the position (height or lateral position) of the roller electrode RE changes, and contact between the electrical connection terminal and the roller electrode occurs. In order to avoid this, by reducing the gap (d2 in a case of the lead pin disposed on the long-side side) between the opening portion of the sealing member (seal ring) and the protruding part of the lid portion, for example, by setting the gap d2 to 0.3 mm or lower, it is possible to suppress the positional deviation of the cover during the seam welding and to prevent the breakage of the electrical connection terminal.

Although airtight sealing using seam welding has been described so far, the sealing method is not limited to this, and other methods such as laser welding may be used.

Figure 9:
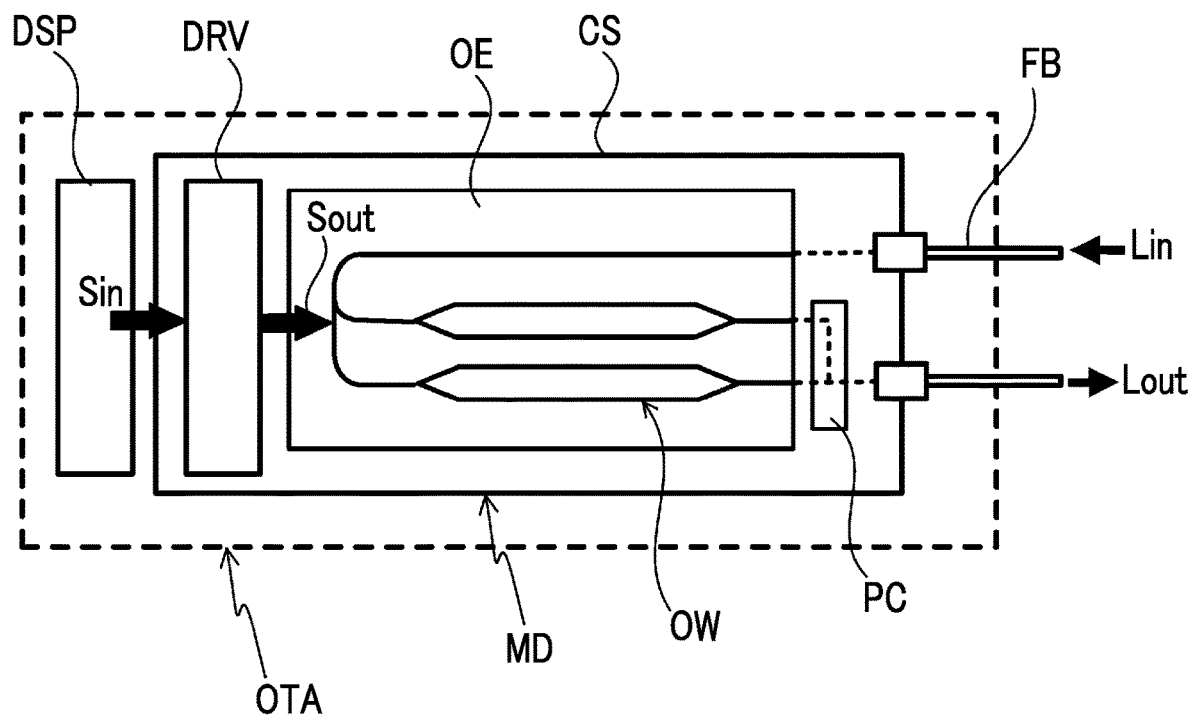
FIG. 9 is a diagram showing an optical transmission device according to the present invention.

FIG. 9 is a diagram showing an example of the optical transmission device.

In the optical modulator, a driver circuit element DRV that generates an electrical signal Sout to be applied to the modulation electrode of an optical waveguide element OE is disposed adjacent to the optical waveguide element, and the optical waveguide element OE and the driver circuit element DRV are accommodated in the same case CS. Input light Lin is input to the optical waveguide element OE through an optical waveguide OW formed on the optical waveguide element by using an optical fiber FB via an optical component such as a lens. On the other hand, light waves output from the optical waveguide element OE are combined through, for example, a polarization combining means PC, and input to another optical fiber via an optical component such as a lens to become output light Lout.

Further, a signal generator DSP (digital signal processing device) that generates a modulation signal Sin to be input to the driver circuit element DRV can be provided to constitute an optical transmission device. It is also possible to incorporate the case CS and the signal generator DSP into one chassis.

INDUSTRIAL APPLICABILITY

As described above, according to the present invention, it is possible to provide an optical modulator that suppresses poor welding between the case main body and the lid portion and an optical transmission device using the same.

REFERENCE SIGNS LIST 1 case main body
10 end surface of side wall (sealing member) forming opening portion of case
2 lid portion
20 protruding part of lid portion
R side edge portion (inclined surface) of protruding part

The invention claimed is:

1. An optical modulator comprising:
a case that is a rectangular parallelepiped and accommodates at least an optical waveguide element,
wherein the case includes a case main body in which one surface of the rectangular parallelepiped forms an opening portion, and a lid portion that has a rectangular shape and that closes the opening portion,
the lid portion includes a peripheral part that has a thin thickness, and a protruding part that is formed on the lid portion excluding the peripheral part and that protrudes toward an inside of the case, and
when the lid portion is fitted into the case main body, a distance between an inner peripheral side of an end surface forming the opening portion of the case main body and an outer edge of the protruding part is set such that a distance formed on a short-side side of the lid portion is larger than a distance formed on a long-side side of the lid portion.

2. The optical modulator according to claim 1,
wherein a side surface of the protruding part of the lid portion includes an inclined portion toward the peripheral part.

3. The optical modulator according to claim 1,
wherein the peripheral part of the lid portion has a thickness of lower than 0.2 mm.

4. The optical modulator according to claim 1,
wherein the protruding part of the lid portion has a thickness of 0.2 mm or higher and 1 mm or lower.

5. The optical modulator according to claim 1,
wherein the opening portion of the case main body is formed by a side wall itself of the case surrounding the opening portion or a sealing member different from the side wall.

6. The optical modulator according to claim 1,
wherein the case main body and the lid portion are sealed by seam welding.

7. The optical modulator according to claim 1,
wherein a driver circuit element that generates an electrical signal to be applied to a modulation electrode provided in the optical waveguide element is disposed adjacent to the optical waveguide element.

8. An optical transmission device comprising:
the optical modulator according to claim 1; and
a signal generator that generates a modulation signal to be input to the driver circuit element.

* * * * *